UNITED STATES PATENT OFFICE.

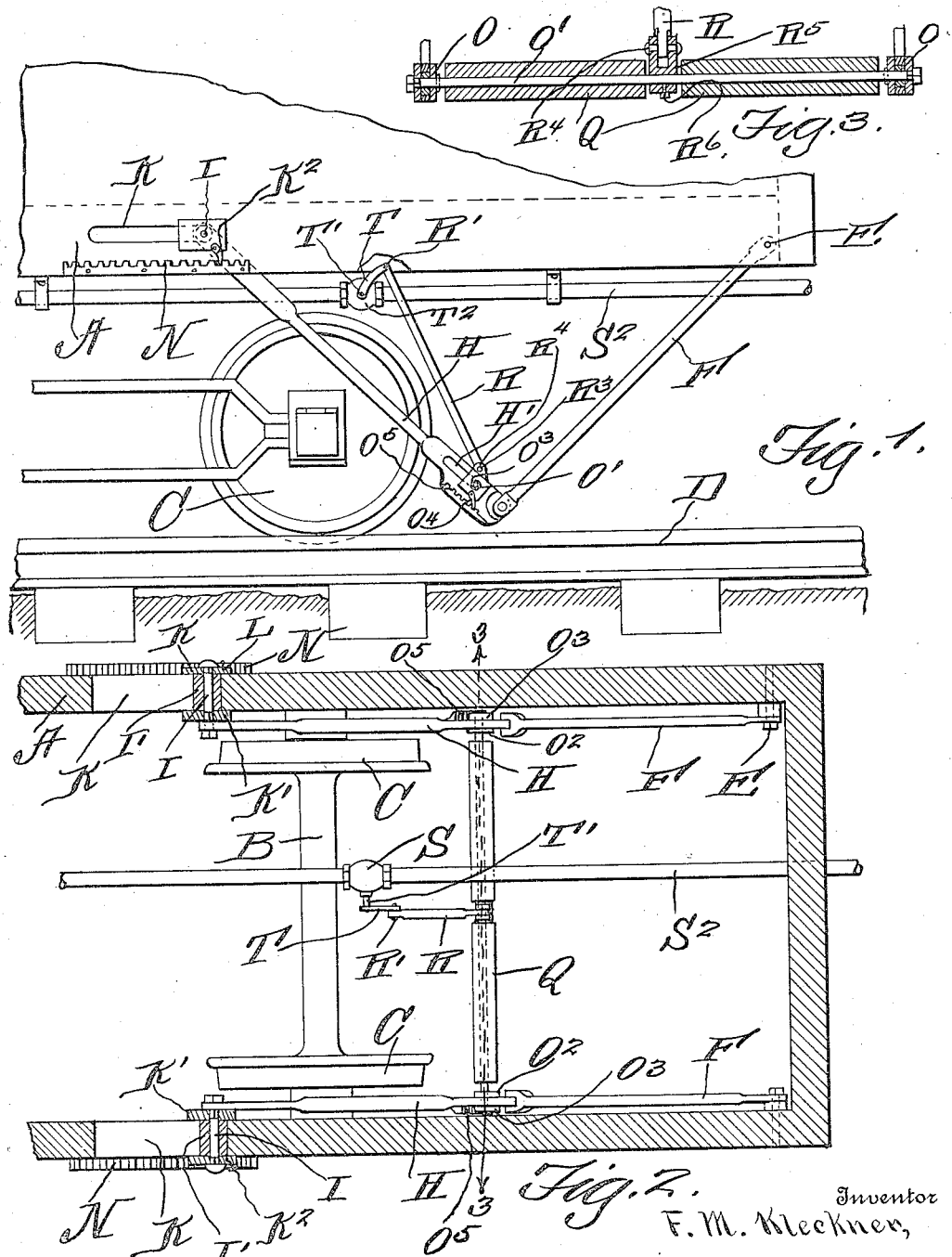

FORTES M. KLECKNER, OF DRUMRIGHT, OKLAHOMA.

EMERGENCY AIR-BRAKE APPLIANCE.

1,148,097.  Specification of Letters Patent.  Patented July 27, 1915.

Application filed October 14, 1914. Serial No. 866,698.

*To all whom it may concern:*

Be it known that I, FORTES M. KLECKNER, a citizen of the United States, residing at Drumright, in the county of Creek and State of Oklahoma, have invented certain new and useful Improvements in Emergency Air-Brake Appliances; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in emergency brake applying apparatus for cars upon railways and comprises a simple and efficient apparatus of this nature so constructed that, in the event of a car leaving the track, automatic brake operating apparatus may be actuated.

My invention comprises a device of this nature having various details of construction, combinations and arrangements of parts which will be hereinafter fully described, shown in the accompanying drawings and then specifically defined in the appended claims.

I illustrate my invention in the accompanying drawings, in which:

Figure 1 is a side elevation showing the application of my invention to a car. Fig. 2 is a transverse sectional view through the car, giving a plan view of the apparatus, and Fig. 3 is a longitudinal sectional view on line 3—3 of Fig. 2.

Reference now being had to the details of the drawings by letter, A designates a car, B the axle journaled therein and C wheels upon the axle, said wheels being upon the tracks D. Pivotally connected at their upper ends to the pins E are the bars F which, at their lower ends, are pivotally connected to the ends of the bars H which in turn are pivotally mounted upon the bolts I mounted upon rollers I' which have a rolling movement in elongated slots K formed in the car. Washers K' and K² are mounted upon said bolt and upon one of the washers K² is pivotally mounted a pawl L, shown clearly in Fig. 1 of the drawings, which is adapted to engage the teeth of the rack bar N secured to the car below the slot K therein, there being one of said rack bars mounted upon either side of the car, as shown in the plan view Fig. 2. The bars H have elongated slots H' in their lower ends and in which the rollers O, journaled upon the rod O', are positioned and in which slots H the rollers have a play. Washers O² and O³ are mounted upon the rod O', one upon either side of the bar H, and serve to keep the rollers Q in proper position within said slots. Pivotal dogs O⁴ are mounted one upon each washer O³ and engage the rack teeth O⁵ formed upon the face of the bar H and serve to hold the valve lever T in different positions. A valve is mounted within the casing T² which is connected to the train pipe S² and said valve is mounted upon a stem T' to which an arm T is fastened and which is pivotally connected at R' to a rod R which in turn is pivotally connected to a pin R³ carried by the arms R⁴ of the block R⁵, which latter is mounted upon the rod O' and held thereon by means of a thumb screw R⁶.

The operation of my invention will be readily understood and is as follows: When a train equipped with my emergency brake operating mechanism happens to leave the track and one of the rollers Q or the pivotal ends of the rods F come in contact with either the track or the tie, an end thrust will be imparted to the bars R and close the valve in the casing T³ of the fluid pressure air brake system, thus allowing the brakes, not shown, to be applied. As the bar R is moved to close the valve, the bars H will also be moved and the pawls L, one on either side of the car, will move idly over the teeth of the rack bar N and thus hold the valve closed. After the car has been replaced upon the tracks, the parts may be returned to their normal positions and again in readiness for operation in case of an emergency.

What I claim to be new is:

1. An emergency brake apparatus for cars comprising, in combination with a car, bars pivoted at their upper ends thereto, a rod connected at the lower end to said bars, a valve and pipe in which the same is mounted, a stem to said valve, a crank to said stem, a link between said crank arm and rod, rack bars upon the car, bars pivoted to said rod, and pawls actuated thereby and adapted to engage the teeth of said rack bars.

2. An emergency brake apparatus for cars comprising, in combination with a car, bars pivoted at their upper ends thereto, a rod connected at the lower end to said bars, a valve and pipe in which the same is mounted, a stem to said valve, a crank to said stem, a link between said crank arm and rod, rack bars upon the car, said car having slots therein, antifriction rollers movable in said slots, pins upon which the rollers are mounted, links between said pins and rod, and pawls actuated by said pin engaging links and movable against said rack bars.

In testimony whereof I hereunto affix my signature in presence of two witnesses.

FORTES M. KLECKNER.

Witnesses:
W. E. MAXWELL,
T. EAGLESTON.